US007378950B2

(12) United States Patent
Lehnen

(10) Patent No.: US 7,378,950 B2
(45) Date of Patent: May 27, 2008

(54) OVERLOAD WARNING MEANS FOR EXCAVATORS

(75) Inventor: Bernd-Joachim Lehnen, Memmingen-Steinheim (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 61 days.

(21) Appl. No.: 11/507,936

(22) Filed: Aug. 21, 2006

(65) Prior Publication Data

US 2007/0083312 A1 Apr. 12, 2007

(30) Foreign Application Priority Data

Aug. 23, 2005 (DE) .................. 20 2005 013 310 U

(51) Int. Cl.
*B60Q 1/00* (2006.01)

(52) U.S. Cl. ....................... 340/440; 340/685; 212/277

(58) Field of Classification Search ................ 340/440, 340/517, 666, 685; 212/277
See application file for complete search history.

(56) References Cited

U.S. PATENT DOCUMENTS 3,612,294 A * 10/1971 Wilkinson .................. 212/277
3,680,714 A 8/1972 Holmes
3,713,129 A 1/1973 Buchholz
4,500,969 A * 2/1985 Hasselmann et al. ....... 340/685
4,752,012 A * 6/1988 Juergens ..................... 212/277
5,251,768 A * 10/1993 Yoshimatsu et al. ........ 212/277
5,257,177 A * 10/1993 Bach et al. ................. 340/685
5,263,597 A * 11/1993 Stewart et al. .............. 212/277
5,711,440 A * 1/1998 Wada ......................... 212/277
5,887,735 A * 3/1999 Abel .......................... 212/277
6,067,024 A * 5/2000 Eckstine et al. ............ 340/685
7,014,054 B2 * 3/2006 Yahiaoui et al. ............ 212/277

FOREIGN PATENT DOCUMENTS

| | | |
|---|---|---|
| DE | 1531166 | 10/1967 |
| DE | 3605462 | 8/1987 |
| DE | 8906788.6 | 9/1989 |
| DE | 19730436 | 6/1998 |
| DE | 10110176 | 9/2002 |
| JP | 2001-106480 | 4/2001 |

* cited by examiner

*Primary Examiner*—John Tweel, Jr.
(74) *Attorney, Agent, or Firm*—Alleman Hall McCoy Russell & Tuttle LLP

(57) ABSTRACT

The present disclosure relates to an overload warning means for excavators, preferably hydraulic excavators or material handling devices, with three or more contact points, the contact forces being determined at the contact points such that they are brought into an order descending by the amount thereof, so that $F_1>F_2>F_3> \ldots >F_n$, and that the static stability is determined according to the following formula:

$$S = \frac{\sum_{i=3}^{n} F_i}{\sum_{i=1}^{n} F_i} \geq S_{min}.$$

20 Claims, 2 Drawing Sheets

OVERLOAD WARNING MEANS FOR EXCAVATORS

CROSS-REFERENCE TO RELATED APPLICATION

This application claims priority to German Utility Model Application Serial No. 20 2005 013 310.8 filed Aug. 23, 2005, which is hereby incorporated by reference in its entirety for all purposes.

FIELD

The present disclosure relates to an overload warning means for excavators, preferably hydraulic excavators or material handling devices with three or more contact points.

BACKGROUND

Overload warning means should provide the operator with the necessary information as regards a possible overload of the device. In the case of hydraulic excavators, which can be used both in civil engineering and as a material handling device in the industry, the overload monitoring means primarily serve as safety instruments, in order to prevent the device from tilting or tipping over.

Overload warning means are already known in various configurations. The following two variants are used:

In a first variant, the hydraulic pressure in the lift cylinder is measured. During operation of the excavator, the hydraulic pressure in the lift cylinder is always monitored. By means of a payload calculation performed in advance via the configuration of the device, the lowest hydraulic cylinder pressure, at which the device still is safely standing in any case, has been determined as a reference value. This calculated pressure is adjusted at the factory by means of a pressure switch. When the pressure in the lift cylinder now exceeds the adjusted value during the load lifting operations, the operator will be warned by a corresponding alarm signal.

In a second variant, the hydraulic pressure in the lift cylinder and at the same time the boom position is measured. As already described above, the hydraulic pressure in the lift cylinder hence is monitored during operation. In addition, the boom position is, however, considered either via the angle or via the cylinder position. For the boom kinematics of the existing configuration, a payload calculation is performed in advance, in which the lowest lift cylinder pressure is calculated for each boom position. By means of these data and the characteristics of the pressure switch, a cam disk is constructed, which rotates in synchronism with the boom and adjusts the correct pressure at the pressure switch for each boom position. When the lift cylinder pressure exceeds the adjusted value during the load lifting operations, the operator will be warned by an alarm signal.

There are also used combinations of the two measuring methods. For example, in the non-supported condition of an excavator, i.e. when operating on the tires, the first variant is used, whereas for the supported condition the second variant is used (or vice versa).

In the above-described overload warning means used so far, a few problems arise, however, in practice.

For the case that the equipment position is not considered, the difference between the calculated tilting load and the actual load-carrying capacity will be up to 40%. If the boom angle now is included in the consideration, and for the remaining equipment parts the most unfavorable condition is each considered, the difference between the calculated tilting load and the actual load-carrying capacity will still be up to 20%.

If it is now desired to accurately determine the equipment position, the position must be determined for each equipment part, for instance by means of an angle detector. This in turn is time-consuming and expensive.

When the configuration of the device now is unknown or has been changed, the overload warning means no longer operates correctly, as due to the calculation from the measured data with the wrong configuration a wrong conclusion is drawn as regards the static stability.

The calculation of the loading condition only can be performed exactly for the case that the device is standing on flat ground. In the case of an inclination in longitudinal and/or transverse direction, the static moment of the machine will be reduced. In this case, the overload warning means will emit the warning signal too late.

BRIEF DESCRIPTION OF THE FIGURES

Further features, details and advantages of the invention can be taken from the embodiment shown in the drawings.

DETAILED DESCRIPTION

Figure 1:
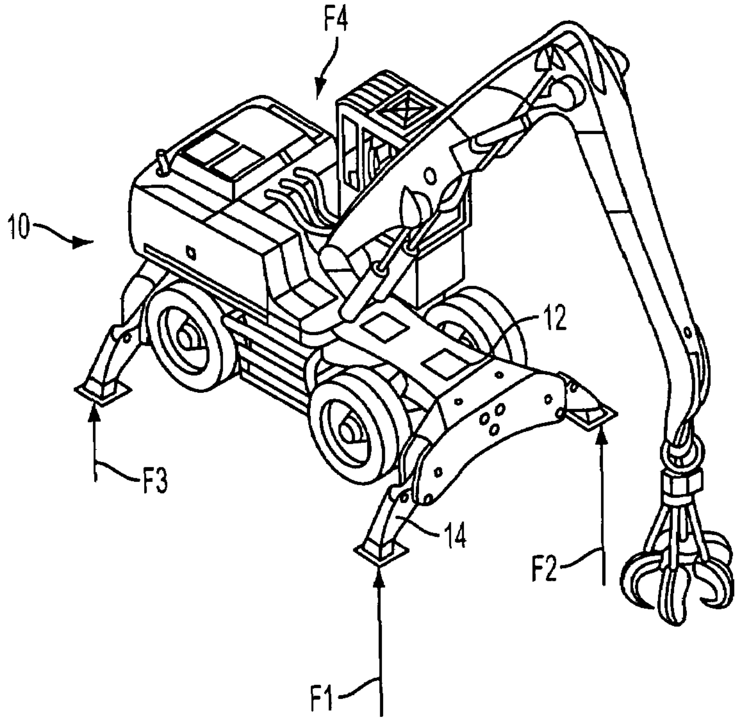
FIGS. 1 and 2 each show a hydraulic excavator in accordance with the present disclosure.

FIG. 1 shows a hydraulic excavator 10 of the usual configuration, on whose undercarriage 12 hydraulically extendable supporting feet 14 are arranged. Thus, a corresponding four-point support has been realized here. In FIG. 1, the contact forces F1, F2, F3 and F4 are indicated at the respective supporting feet 14.

Figure 2:
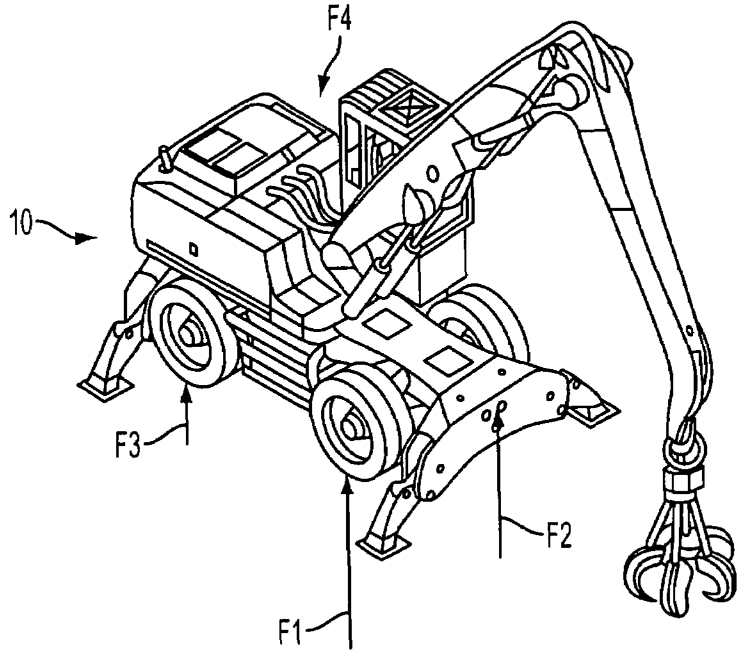

FIG. 2 corresponds to the illustration shown in FIG. 1. In contrast to FIG. 1, however, the corresponding contact forces F1, F2, F3 and F4 are indicated at the wheels of the hydraulic excavator 10. Said forces should be considered when the excavator 10 is not supported via the four-point support.

Figure 3:
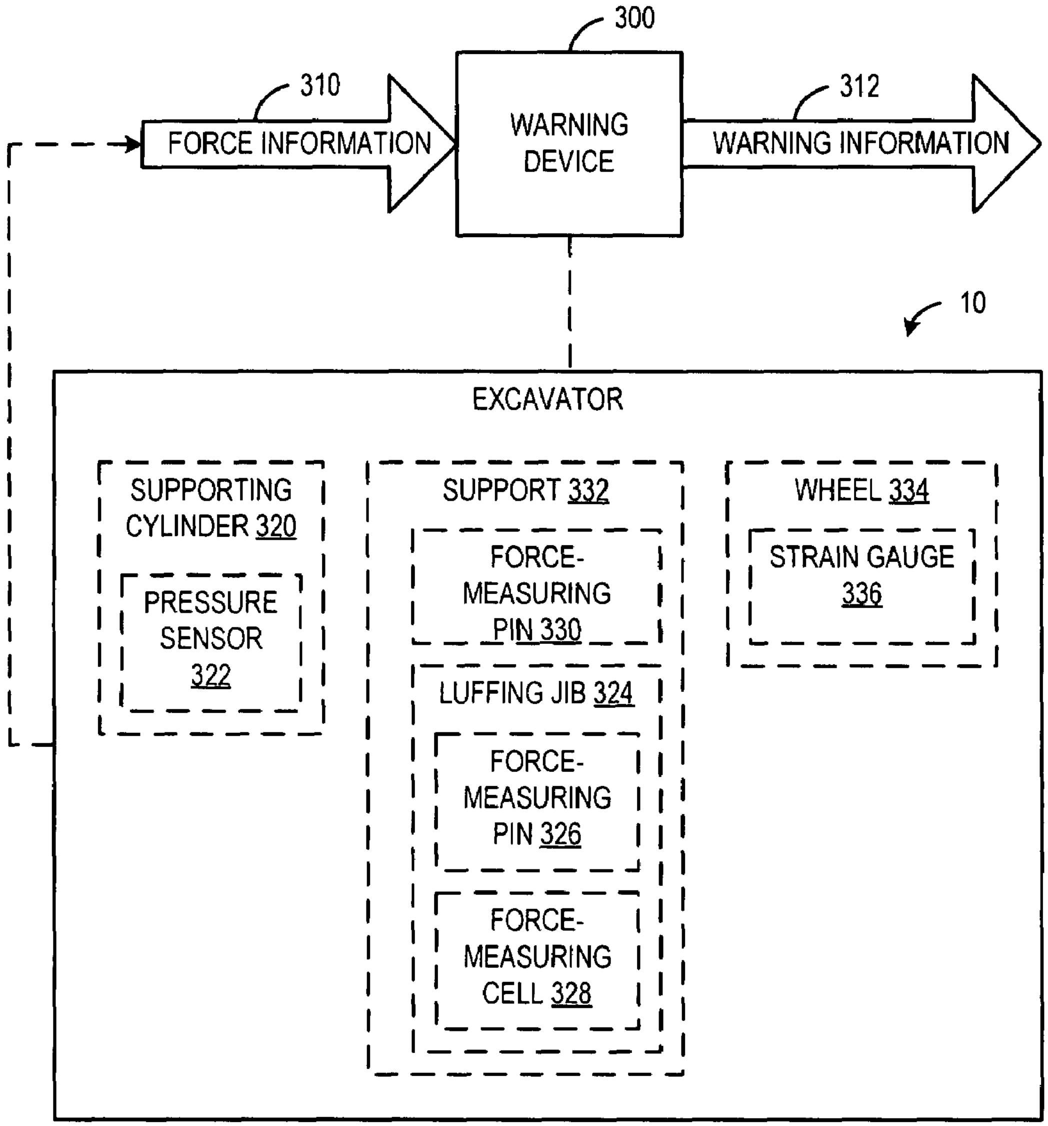
FIG. 3 shows an overload warning device in accordance with the present disclosure.

FIG. 3 schematically shows an overload warning device 300 receiving force information 310 (such as the measured or calculated forces noted herein) and outputting at least a warning indication 312. Device 300 may communicate and/or cooperate with the example excavator 10 of FIGS. 1-2, as described herein. Further, device 300 may carry out various methods as described herein.

Excavator 10 may include a variety of different devices for measuring one or more contact forces that can be used to determine a static stability. As a nonlimiting example, excavator 10 can include one or more supporting cylinders 320, each of which is characterized by a measurable cylinder pressure. Such supporting cylinders can include a piston and/or a rod onto which a pressure sensor 322 can be mounted. In some embodiments, the excavator can include luffing jibs 324. Force measuring pins 326 and/or force measuring cells 328 can be used to meassure contact forces at the luffing jibs. In some embodiments, force measuring pins 330 can be used to measure contact forces where a support 332 is pinned to an undercarriage of the excavator. In some embodiments, the excavator can include one or more wheels 334, and contact forces can be measured by measuring wheel loads. A strain guage 336 can be used to measure wheel load.

Proceeding from the above-mentioned problems with known overload warning means, it is the object of the present disclosure to develop a generic overload warning means such that an overload condition can be determined and indicated immediately and correctly.

In accordance with the present disclosure, this object is solved by an overload warning for excavators, preferably hydraulic excavators or material handling devices, with three or more contact points, where the contact forces at the contact points are determined and brought into a descending order in terms of their size, and where the static stability is determined according to a specified formula.

Accordingly, in the example of four supports, the four contact forces on the generally four supporting points of the excavator are determined. i.e. the supporting or wheel loads of the excavator are measured, as by means of these loads the static stability of the excavator can be determined directly. Further, in accordance with the present disclosure, the contact forces on the four supporting points therefore are brought into an order descending according to the amount thereof, so that $F_1>F_2>F_3> \ldots >F_n$. And with these values, the static stability is determined according to the following formula:

$$S = \frac{\sum_{i=3}^{n} F_i}{\sum_{i=1}^{n} F_i} \geq S_{\min},$$

For n=4 contact points, the following applies:

$$S = \frac{F_3 + F_4}{F_1 + F_2 + F_3 + F_4} \geq S_{\min}$$

In the aforementioned rule it is thus assumed that in case the sum of the two smaller contact forces based on the sum of the total contact forces falls below a predetermined amount, the device tends to tilting over.

This minimum static stability value $S_{mm}$ usually is fixed by means of standards. For hydraulic excavators used in the construction and materials handling industry the standard ISO 10567 is applicable, for instance. The nominal load is defined here to be 75% of the static tilting load, which leads to a minimum static stability $S_{min}$ of 25%. Therefore, the preferred value is $S_{min}=0.25$.

When the accordingly measured value of the contact forces thus exceeds the value $S_{min}$, a corresponding warning signal will be output to the excavator operator. Possibly, direct action can be taken on the control of the excavator, in order to prevent the same from falling over.

By means of the overload warning means of the present disclosure, the static stability can advantageously be determined exactly at any time and for any position. It is sufficient to measure the contact forces of the excavator. For calculating the static stability no further details are necessary. It is not necessary either to measure any angles of the equipment or the uppercarriage position. It is not necessary to perform any pre-calculations for various configurations of the device. The preparation and administration of cam disks for various configurations can be omitted. In contrast to the overload warning means of the prior art, no adjustments must be made on the excavator. Changes of the equipment configuration itself have no influence on the accuracy of the static stability calculation. An inclined position of the device, i.e. an inclination in longitudinal and/or transverse direction, will likewise be considered in the determination of the static stability.

In accordance with a first particularly advantageous aspect of the present disclosure, the contact forces can be measured via the cylinder pressures of the supporting cylinders of the support. For this purpose, pressure sensors are advantageously mounted on the piston of each cylinder. By means of the known piston area and the supporting kinematics, the four supporting forces can then be calculated. It should, however, be noted that the cylinders should not be fully extended to a stop, as then the pressure on the part of the piston alone will no longer provide any sufficient information as to the supporting force. In this case, the pressures on the part of the piston and on the part of the rod would have to be measured, and the resulting forces would have to be subtracted from each other.

By measuring the cylinder pressures in the terminal cylinders, the static stability can be determined only for the supported condition of the device. In most cases, this is already sufficient, especially in fields of use where load lifting operations are primarily or only performed in the supported condition. For the non-supported condition of these devices, the first variant of the overload warning means discussed already in the prior art might be used in addition.

Another preferred aspect of the present disclosure leads to the fact that the supporting forces can be determined via force measuring pins or force measuring cells at the luffing jibs of the respective supporting means. This aspect of the present disclosure involves the advantage that the supporting forces are measured directly and need not first be converted via the supporting kinematics. The corresponding force measuring pins and force measuring cells must each be protected against soiling and against being damaged.

Another alternative consists in mounting force measuring pins at the respective point of pinning the supporting cylinder to the undercarriage. This results in a particularly simple wiring, and the risk of soiling is largely eliminated. In contrast to the above-discussed preferred aspect, however, the forces must again be converted via the supporting kinematics. By means of the aforementioned aspect of the present disclosure, only the supporting forces can be determined, but not the wheel loads.

Another preferred aspect of the present disclosure includes determining the wheel loads via strain gauges. For this purpose, strain gauges should be mounted at the axles on a suitable point, and the wheel loads can then be determined from a deflection of the axles. Here the strain gauges must correspondingly be protected against being damaged. This method of measurement requires a preceding calibration.

The invention claimed is:

1. A device, comprising:

an overload warning means for excavators with three or more contact points, wherein contact forces at the contact points are determined and brought into an order descending by the amount thereof, so that $F_1>F_2>F_3> \ldots >F_n$, and a static stability is determined according to the following formula:

$$S = \frac{\sum_{i=3}^{n} F_i}{\sum_{i=1}^{n} F_i} \geq S_{\min}.$$

where:

S is the determined static stability, $F_1$, $F_2$, $F_3$, . . . $F_n$ are the contact forces, and $S_{min}$ is a predetermined minimum static stability.

2. The device as claimed in claim 1, wherein the excavators are hydraulic excavators or material handling devices.

3. The device as claimed in claim 1, wherein $S_{min}$ has a value of 0.25.

4. The device as claimed in claim 1, wherein an excavator includes a plurality of supporting cylinders, and wherein contact forces are measured via cylinder pressures at each of the supporting cylinders.

5. The device as claimed in claim 3, further comprising a pressure sensor mounted on a piston and/or on a rod of each supporting cylinder.

6. The device as claimed in claim 1, wherein the contact forces are measured via force measuring pins or force measuring cells at luffing jibs of a support.

7. The device as claimed in claim 4, wherein the contact forces are measured via force measuring pins at points where the supporting cylinders are pinned to an undercarriage.

8. The device as claimed in claim 1, wherein the contact forces are determined by measuring wheel loads.

9. The device as claimed in claim 8, wherein the measurement of the wheel loads is effected via strain gauges.

10. A hydraulic excavator with three or more contact points (1, 2, 3), each contact point having a corresponding contact force (F), comprising:

an overload warning system, the system determining contact forces at the contact points and ordering the contact forces in a descending order by the amount thereof, so that $F_1 > F_2 > F_3 > \ldots > F_n$, determining a static stability according to the following formula:

$$S = \frac{\sum_{i=3}^{n} F_i}{\sum_{i=1}^{n} F_i} \geq S_{\min},$$

and providing a warning in response to said determined static stability, where:

S is the determined static stability, $F_1$, $F_2$, $F_3$, . . . $F_n$ are the contact forces, and $S_{min}$ is a predetermined minimum static stability.

11. A method of monitoring a hydraulic excavator with three or more contact points (1, 2, 3), each contact point having a corresponding contact force (F), comprising:

measuring contact forces at each of the contact points;

ordering the contact forces in a descending order by the amount thereof, and providing a warning in response to a static stability calculation, said static stability calculation including a ratio of a sum of at least the smallest force to a sum of all of the forces.

12. The method as claimed in claim 11, wherein the excavators are hydraulic excavators or material handling devices.

13. The method as claimed in claim 12, wherein said warning is provided as said ratio approaches approximately a value of 0.25.

14. The method as claimed in claim 13, further comprising measuring the contact forces measured via cylinder pressures of supporting cylinders.

15. The method as claimed in claim 13, further comprising measuring the contact forces via force measuring pins or force measuring cells at luffing jibs of a support.

16. The method as claimed in claim 13, further comprising measuring the contact forces by measuring wheel loads.

17. The method as claimed in claim 11, wherein said warning is provided without measuring any angles of the excavator or an uppercarriage position.

18. The method as claimed in claim 11, wherein said warning is provided without performing any pre-calculations for various configurations of the excavator.

19. The method as claimed In claim 11, further comprising automatically accounting for changes of equipment configurations of the excavator.

20. The method as claimed in claim 11, further comprising automatically accounting for changes in an inclined position of the device including an Inclination in longitudinal and/or transverse direction.

* * * * *